United States Patent [19]

Howard

[11] Patent Number: 4,961,991
[45] Date of Patent: Oct. 9, 1990

[54] FLEXIBLE GRAPHITE LAMINATE

[75] Inventor: Ronald A. Howard, Brook Park, Ohio

[73] Assignee: Ucar Carbon Technology Corporation, Danbury, Conn.

[21] Appl. No.: 471,531

[22] Filed: Jan. 29, 1990

[51] Int. Cl.$^5$ .............................................. B32B 31/06
[52] U.S. Cl. .................................... 428/246; 277/227; 277/DIG. 6; 428/251; 428/408; 428/421; 428/422
[58] Field of Search ............... 428/246, 251, 408, 421, 428/422; 277/DIG. 6, 227

[56] References Cited

U.S. PATENT DOCUMENTS 4,822,062  4/1989  Gallo et al. .................... 277/235

FOREIGN PATENT DOCUMENTS 248785  12/1983  Japan .

OTHER PUBLICATIONS

GRAFOIL® Flexible Graphite Sales Literature of UCAR Carbon Company Inc.
GRAFOIL® Flexible Graphite Design Data Sales Literature of UCAR Carbon Inc.

Primary Examiner—James J. Bell
Attorney, Agent, or Firm—Cornelius F. O'Brien

[57] ABSTRACT

A flexible graphite laminate suitable for use as gaskets in which a polymer resin coated cloth, such as polytetrafluroethylene coated fiber glass cloth, is disposed and bonded between two sheets of flexible graphite material. A method for producing the flexible graphite laminate is also disclosed.

10 Claims, No Drawings

FLEXIBLE GRAPHITE LAMINATE

FIELD OF THE INVENTION

The invention relates to flexible graphite laminates suitable for use as gaskets, said laminates containing a polymer resin coated cloth dispersed and bonded between two sheets of flexible graphite material.

BACKGROUND OF THE INVENTION

A wide variety of flexible graphite laminates are manufactured for use as gaskets for various applications. Some of the laminates contain metal or plastic sheets bonded between two sheets of flexible graphite material. The plastic or metal interlayer is used to increase the strength and ease of handling of the laminate during cutting to form gaskets and to give strength to the gaskets when they are put in place for use. The use of a metal interlayer also improves the resistance of the gasket to blowout and reduces high temperature creep of the gasket when exposed to a high temperature environment. The metal interlayer gaskets are extremely strong; however, cutting the laminate will expose sharp edges which can present a hazard to personnel handling the gasket.

Japanese Patent Application No. 1983-248,785 discloses gasket materials in which a metal net is disposed and sealed within two sheets of flexible graphite. The metal net is employed as a reinforcing material since graphite sheets when used alone as a gasket have problems in that the strength of the gasket is weak. The gasket material is prepared by arranging a flexible graphite sheet obtained by cold-working graphite commonly known as expanded graphite, on both sides of a metal net and then press-adhering the graphite to the metal net.

It is an object of the present invention to provided flexible graphite laminates suitable for use as gaskets having excellent resistance to interlaminar leakage.

It is another object of the present invention to provide flexible graphite gaskets comprising a polymer resin coated cloth disposed and bonded between two sheets of flexible graphite material.

It is another object of the present invention to provide a flexible graphite gasket comprising a polytetrafluroethylene coated woven fiber glass cloth disposed and so bonded between two sheets of flexible graphite material.

It is another object of the present invention to provide a method for producing flexible graphite laminates comprising a polymer resin coated cloth disposed and bonded between two sheets of flexible graphite material.

Additional objects of the invention will become evident from the description that follows.

SUMMARY OF THE INVENTION

The invention relates to a flexible graphite laminate comprising a polymer resin coated cloth disposed and bonded between two sheets of flexible graphite material.

As used herein a cloth is a pliable fabric made usually by weaving, felting or knitting natural or synthetic fibers and filaments. The flexible graphite laminate of this invention has high strength, good handling characteristics and good resistance to interlaminar leakage. In a preferred embodiment, the polymer resin would be polytetrafluroethylene and the cloth would be fiber glass and the graphite would be flexible graphite.

The invention also relates to a method for producing a flexible graphite laminate comprising the steps:

(a) placing a polymer resin coated cloth between two sheets of flexible graphite; and (b) pressing the sheets of flexible graphite together while heating to a temperature sufficient to soften the polymer resin thereby bonding together the polymer resin coated cloth between the two sheets of flexible graphite to produce a flexible graphite laminate.

The flexible graphite laminate produced can be cut into gaskets that will have good strength and handling characteristics and have no sharp edges. In addition, the laminate produced gaskets will have good resistance to blowout and high-temperature creep. The cloth for use in this invention could be woven or nonwoven fabric made of ceramic fibers such as fiber galss, $Al_2O_3$ or SiC, or carbon fibers such as graphite. The coated cloth could be a non-porous or porous cloth and vary in thickness from 0.0005 inch to about 0.020 inch with a thickness of from 0.002 inch to 0.005 inch being preferred for most gasket applications. Some suitable cloths are fiber glass, alumina, zirconia, carbon, or any high temperature polymer. The preferred polymer resins for use in this invention are resins such as polytetrafluroethylene, aramides, polyamides, polyamidemides, polyesters, polyimides and the like. The specific resin selected could be thermoplastic or thermosetting and should be one that will be suitable for the environment in which the laminate will be used. An example of a thermosetting resin is a phenolic or polyester resin. Preferably, the polymer resin could be thermoplastic so that when coated onto the surface of a suitable cloth and subjected to a high temperature environment, the polymer resin will soften so that it can then be bonded between two sheets of graphite material using a suitable amount of pressure. The high temperature environment used should be sufficient to soften the polymer resin and permit the coated cloth to be pressure bonded between two sheets of flexible graphite. Generally, a temperature between about 80° C. and 400° C. would be suitable for most thermoplastic polymer resins. The preferred polymer resin is polytetrafluroethylene which should preferably be heated from about 350° C. to 370° C. The pressure applied to the laminate while the resin is soft shall be sufficient to insure good contact and bond between the layers of the flexible graphite. Generally a pressure of about 50 pounds per square inch or more would be sufficient for most applications. If the polymer resin selected is not thermoplastic, then a suitable adhesive such as a chloroprene rubber may be used to bond the filled cloth between the graphite sheets. However, if a thermosetting resin is used, then in some applications, it could be used in the "B stage" condition so that an adhesive would not be necessary. The adhesive, when used, must be one that will bond to the polymer resin selected. The polymer resin is primarily used to fill and coat the cloth so that not only are the fibers coated but also any space between the fibers are completely filled with the resin. This will produce a non-porous cloth that will insure that no interlaminar leakage will occur in the laminate structure thereby insuring that when the laminate is used as a gasket, it will have minimum leakage.

The flexible graphite preferred for use in the laminate of this invention is flexible graphite sheet material produced as described in U.S. Pat. No. 3,404,061. Specifically the process comprises treating flake graphite particles with a suitable oxidizing medium to form soggy graphite particles which are heated to permit a natural expansion and then compressed or compacted together, in the absence of any binder, so as to form a flexible integrated graphite sheet of desired thickness and density. The compression or compaction is carried out by passing a thick bed of expanded particles between pressure rolls or a system of multiple pressure rolls to compress the material in several stages into sheet material of desired thickness. The compression operation flattens the expanded graphite particles causing them to engage and interlock. However, if the compressive force applied to the particles is excessive, the particles split and separate causing weak spots which puncture to form pinholes when forming very thin sheets. Accordingly, the sheet thickness was heretofore substantially limited to a thickness in excess of about ten mils. One recent proposal for forming thin sheet graphite material with a thickness equal to ten mils without forming pinholes is described in Japanese patent publication application No. 61(1986)-133865 entitled Method For Producing Flex Graphite Sheet. According to the Japanese publication a thin graphite sheet can be formed without pinholes by applying an adhesive layer and expanded graphite on a polyester film, metal foil or paper tape before the graphite sheet is rolled down to the desired thickness of ten mils.

U.S. application Ser. No. 373,914 titled Ultra-thin Pure Flexible Graphite, describes that a sheet of ultra-thin graphite of below ten mils in thickness can be formed without pinholes from natural graphite particles by increasing the degree of expansion of the particles during the exfoliation operation to produce particles which, prior to compression, have been expanded to a specific volume of at least 450 cc/gm. By causing the exfoliated graphite particles to expand before compression to at least this minimum specific volume substantially reduces the susceptibility of forming pinholes during compression of the particles into ultra-thin sheet material of below 8 mils in thickness and particularly between 1–4 mils in thickness with a high degree of area/weight uniformity. The process disclosed in this application is applicable primarily to natural graphite particles.

For most gasket applications, the flexible graphite sheet should be from 0.002 inch to 0.080 inch thick and preferrably from 0.005 inch to 0.060 inch thick. The cloth for gasket application can be from 0.0005 inch to 0.020 inch thick and preferably from 0.002 inch to 0.005 inch thick. The overall laminate for use in most gasket applications can be from 0.0045 inch to 0.180 inch thick and preferably from 0.012 inch to 0.125 inch thick. The polymer resin should be applied to coat at least the fibers and preferably also any spaces between the fibers so that the cloth is non-porous. There should be sufficient excess resin on the surface of the cloth to insure that bonding to the flexible graphite sheets will take place. As stated above, if the polymer resin is thermoplastic, then it can serve to bond the graphite sheets of the laminate together. If the polymer resin is not a thermoplastic resin or a "B stage" thermosetting resin, then a suitable adhesive could preferably be used to bond the cloth between the flexible graphite sheets.

The preferred laminate for use as gaskets would comprise a fiber glass cloth coated and filled with polytetrafluroethylene and then pressure bonded between two sheets of flexible graphite sheets. A preferred flexible graphite sheet material is sold by UCAR Carbon Company Inc under the trademark Grafoil which is registered to UCAR Carbon Technology Corporation.

EXAMPLE

Two variations of flexible graphite laminates were produced as follows. The first variety (Sample A) comprised a polytetrafluoroethylene coated fiber glass cloth dispersed between two sheets of Grafoil flexible graphite. The polytetrafluoroethylene coated the fiber glass threads and bonded the weave together but did not fill the spaces between the threads so that the cloth was porous. The coated cloth was 2.5 mils thick and each of the sheets of flexible graphite was 30 mils thick. The laminate was hot-bonded at a temperature between 300° C. and 325° C. at a pressure from 50 to 300 pounds per square inch. This high temperature softened the polytetrafluroethylene and under the applied pressure, the polytetrafluroethylene bonded the cloth between the flexible graphite sheets. The laminate was cut to produce a gasket ring with a 90 mm outside diameter and a 50 mm inside diameter. The edge of the gasket ring was smooth.

A second variety (Sample B) was made the same way except that additional polytetrafluoroethylene was used to fill all the voids and spaces in the fiber glass cloth so that the cloth was non-porous. This second variety could also be thought of as a solid sheet of polytetrafluroethylene in which the fiber glass cloth was used as an internal reinforcement.

The two gaskets were tested for sealability according to the DIN 3535 sealability test which is a test generally employed in West Germany and to some degree in other European countries and the United States. Specifically, nitrogen gas at 580 pounds per square inch (40 bars) was introduced to the center of the gaskets while the gaskets were clamped under a force of 1000 pounds per square inch. The gas leak rate in ml/min was then measured through the gasket. The clamping force is then increased in stages up to 4600 pounds per square inch and the leak rate was measured at each stage. The results of the test are shown in the Table.

TABLE

| Sample Gasket A | | Sample Gasket B | |
| --- | --- | --- | --- |
| Clamping Load (psi) | Leak Rate (ml/min) | Clamping Load (psi) | Leak Rate (ml/min) |
| 1000 | 66 | 1000 | 18 |
| 1500 | 61 | 1500 | 17 |
| 2000 | 52 | 2000 | 14 |
| 2500 | 42 | 2500 | 9 |
| 4600 | 18 | 4600 | 3 |

The results of the data show that the use of a non-porous gasket of polytetrafluroethylene coated and filled fiber glass interlayer dramatically improved the sealability over a porous gasket.

While in the foregoing specification a detailed description of specific embodiments of the invention was set forth for the purpose of illustration, it is to be understood that many of the details herein given may be varied considerably by those skilled in the art without departing from the spirit and scope of the invention.

What is claimed:

1. A flexible graphite laminate comprising a polymer resin coated cloth disposed and bonded between two sheets of flexible graphite material.

2. The flexible graphite laminate of claim 1 wherein the polymer resin is thermoplastic.

3. The flexible graphite laminate of claim 1 wherein the polymer resin is selected from the group consisting of polytetrafluroethylene, aramide, polyamides, polyamidemides, polyesters and polyimides 4. The flexible graphite laminate of claim 2 wherein the polymer resin is polytetrafluorethylene.

5. The flexible graphite laminate of claim 1 wherein the cloth is made from fibers selected from the group consisting of ceramic fibers and carbon fibers.

6. The flexible graphite laminate of claim 5 wherein the cloth is fiber glass.

7. The flexible graphite laminate of claim 1 wherein the laminate is a gasket.

8. The flexible graphite laminate of claim 7 wherein the gasket is from 0.0045 to 0.180 inch thick.

9. The flexible graphite laminate of claim 7 wherein the polymer resin is polytetrafluroethylene and the cloth is fiber glass.

10. The flexible graphite laminate of claim 9 wherein the gasket is from 0.0045 inch to 0.180 inch thick.

* * * * *

UNITED STATES PATENT AND TRADEMARK OFFICE
Certificate

Patent No. 4,961,991                                              Patented: Oct. 9, 1990

On petition requesting issuance of a certificate for correction of inventorship pursuant to 35 U.S.C. 256, it has been found that the above-identified patent, through error and without any deceptive intent, improperly sets forth the inventorship.

Accordingly, it is hereby certified that the correct inventorship of this patent is: Ronald A. Howard and James J. Polomsky.

Signed and Sealed this 16th Day of April, 1991.

GEORGE F. LESMES

*Supervisory Patent Examiner*
*Art Unit 154*